(12) United States Patent
Jain et al.

(10) Patent No.: US 9,716,613 B2
(45) Date of Patent: **\*Jul. 25, 2017**

(54) AUTOMATED ALERT MANAGEMENT

(71) Applicant: Bank of America Corporation, Charlotte, NC (US)

(72) Inventors: Rohit Jain, Haryana (IN); Vikas Dwivedi, Hyderbad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,271

(22) Filed: Nov. 17, 2015

(65) Prior Publication Data

US 2016/0072662 A1   Mar. 10, 2016

Related U.S. Application Data

(63) Continuation of application No. 14/642,157, filed on Mar. 9, 2015, now Pat. No. 9,219,639, which is a
(Continued)

(51) Int. Cl.
*G06F 15/173* (2006.01)
*H04L 12/24* (2006.01)
(Continued)

(52) U.S. Cl.
CPC .......... *H04L 41/0604* (2013.01); *G06F 11/00* (2013.01); *G06F 11/0709* (2013.01); *G06F 11/0781* (2013.01); *G06F 11/3006* (2013.01); *G06F 11/3055* (2013.01); *G06F 11/3409* (2013.01); *G06F 11/3495* (2013.01); *H04L 41/069* (2013.01); *H04L 41/0686* (2013.01); *H04L 43/00* (2013.01); *H04L 67/025* (2013.01); *G06F 11/3476* (2013.01); *G06F 2201/86* (2013.01); *Y02B 60/165* (2013.01)

(58) Field of Classification Search
USPC .......................... 709/206, 223, 224; 725/33
See application file for complete search history.

(56) References Cited

U.S. PATENT DOCUMENTS 7,945,814 B2   5/2011   Watanabe et al.
7,945,817 B1   5/2011   Usery et al.
(Continued)

OTHER PUBLICATIONS

"Maximo Technology for Business and IT Agility," IBM Software, Mar. 2010.
(Continued)

*Primary Examiner* — Liangche A Wang
(74) *Attorney, Agent, or Firm* — Banner & Witcoff, Ltd.; Michael A. Springs

(57) ABSTRACT

Alerts may be received from an event monitoring system that monitors computing resources of a computer system. Based on an alert ruleset, an alert management module may determine whether to provide notification of the alert. If the alert management module decides to provide notification of the alert, then the alert management module may initiate the creation of an issue ticket corresponding to the alert in an issue tracking system. If the alert management module decides not to provide notification of the alert, then the alert management module may discard the alert.

20 Claims, 5 Drawing Sheets

Related U.S. Application Data continuation of application No. 13/736,606, filed on Jan. 8, 2013, now Pat. No. 9,009,307.

(51) Int. Cl.
| | | |
|---|---|---|
| *H04L 29/08* | (2006.01) |
| *G06F 11/00* | (2006.01) |
| *H04L 12/26* | (2006.01) |
| *G06F 11/30* | (2006.01) |
| *G06F 11/07* | (2006.01) |
| *G06F 11/34* | (2006.01) |

(56) References Cited

U.S. PATENT DOCUMENTS

| | | | |
|---|---|---|---|
| 8,010,840 B2 | 8/2011 | Chavez, Jr. et al. | |
| 8,161,326 B2 | 4/2012 | Dixit et al. | |
| 2006/0293891 A1 | 12/2006 | Pathuel | |
| 2008/0120688 A1 | 5/2008 | Qiu et al. | |
| 2009/0228917 A1 | 9/2009 | Yun | |
| 2011/0093806 A1* | 4/2011 | Cohen | G06Q 10/10 715/772 |
| 2012/0011406 A1 | 1/2012 | Williams et al. | |
| 2012/0051263 A1* | 3/2012 | Ozawa | H04L 12/2697 370/254 |
| 2012/0151358 A1* | 6/2012 | Joanny | G06F 9/5011 715/736 |
| 2013/0040636 A1 | 2/2013 | Borg et al. | |
| 2013/0232382 A1* | 9/2013 | Jain | H04L 41/069 714/48 |
| 2014/0143395 A1* | 5/2014 | Geltner | H04L 41/0893 709/223 |

OTHER PUBLICATIONS

"Maximo Asset Management," retrieved from http://www-03.ibm.com/software/products/en/maximoassetmanagement/ on Nov. 12, 2013.

"Understanding the Impact and Value of Enterprise Asset Management," IBM Software, Mar. 2012.

"Unified Management for Cloud OS with System Center 2012 R2," retrieved from http://www.microsoft.com/en-us/server-cloud/products/system-center-2012-r2/default.aspx on Nov. 12, 2013.

\* cited by examiner

| Primary Condition | Secondary Condition | Priority |
|---|---|---|
| Email test connectivity alert | | High |
| Memory pool non-paged bytes monitor | | Medium |
| Monitoring failed to run the test health command | | Low |
| Email public folder database alert | "is not mounted" | Medium |
| Server rebooted unexpectedly | | Medium |
| File group is running out of space | | Medium |
| Logical disk free space is low | Check for source value F: or G: | Medium |
| Email test local mail flow alert | | Medium |
| Provisioning engine service is not running | | Medium |
| Cron job service is not running. | | Low |
| Poison threshold exceeded | | Medium |

FIG. 4

AUTOMATED ALERT MANAGEMENT

CROSS-REFERENCE TO RELATED APPLICATION

This application is a continuation of U.S. patent application Ser. No. 14/642,157 entitled "Automated Alert Management" and filed on Mar. 9, 2015 which is a continuation of U.S. patent application Ser. No. 13/736,606 entitled "Automated Alert Management" and filed on Jan. 8, 2013 which issued as U.S. Pat. No. 9,009,307 on Apr. 14, 2015. Both of these applications are incorporated by reference herein in their entirety.

TECHNICAL FIELD

Aspects of the invention generally relate to computer event monitoring. In particular, various aspects of the invention include an approach to managing alerts generated by an event monitoring system that monitors computing resources of a computing system.

BACKGROUND

Event monitoring systems may be employed to monitor the state, health, and performance of the computing systems. The computing systems may include various computing resources such as, for example, computing devices, hardware components, and software applications. An event monitoring system may be configured to generate alerts in response to events, situations, or conditions relating to the computing resources being monitored.

When an alert is generated, the event monitoring system may send a message, such as an email, to an information technology (IT) support team to notify the IT support team of an issue with the computing system. In response to receipt of the alert message, an IT support team member may review the alert message and, if necessary, create an issue ticket in an issue tracking system so that an IT support team member may subsequently address the issue identified in the alert.

For large organizations having enterprise-wide computing systems, effectively addressing incidents occurring at the computing system can be a challenge due to the volume of alerts generated by the event monitoring systems. In some circumstances, IT support teams have been known to receive as many as 1,600 alerts per day. As a result, IT support teams may devote a significant amount of time to simply reviewing alerts, determining which alerts need to be addressed, and, creating issue tickets in the issue tracking system if necessary. Therefore, a need exists for improved approaches to managing alerts generated by an event monitoring system.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Alerts are received from an event monitoring system that monitors computing resources of a computer system. Based on an alert ruleset, an alert management module determines whether to provide notification of the alert. If the alert management module provides notification of the alert, then the alert management module may initiate the creation of an issue ticket corresponding to the alert in an issue tracking system. If the alert management module does not provide notification of the alert, then the alert management module may discard the alert.

The alert management module may automatically provide notification of the alert when the alert is listed in the alert ruleset. If the alert is a duplicate alert, then the alert management module might not provide notification of the duplicate alert. The alert management module may determine that the alert is a duplicate alert when a previous alert associated with the same computing resource was received within a predetermined time period prior to receipt of the alert.

The alert management module may also provide notification of the alert when the alert is associated with a first type of computing resource, but not when the alert is associated with a second type of computing resource. Additionally, even if the alert type of the alert is listed in the alert ruleset, the alert management module might not automatically provide notification of the alert unless a secondary condition associated with the alert is satisfied. The alert ruleset may define and specify any secondary conditions respectively associated with the alert types listed in the alert ruleset.

The alert management module may also determine whether the issue ticket was successfully created in the issue tracking system. If the issue ticket was not successfully created, the alert management module may update an exception log to indicate the issue ticket was not successfully created. The alert management module may also notify the IT support team member of the exception.

The alert ruleset may further specify a priority for the alert types listed in the alert ruleset. The alert management module may configure the issue tickets created for received alerts based on the priorities specified in the alert ruleset.

Aspects of this disclosure address one or more of the issues mentioned above by disclosing methods, non-transitory computer readable media, and apparatuses for automatically managing alerts generated by an event monitoring system. Aspects of the disclosure may be provided in a non-transitory computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements.

FIG. 4 is an example of an implementation of an alert ruleset.

DETAILED DESCRIPTION

As discussed above, there is a need for improvements to the way an organization manages alerts generated by event monitoring systems that monitor the state, health, and performance of computing resources of a computing system.

In accordance with various aspects of this disclosure, methods, non-transitory computer-readable media, and apparatuses are disclosed in which an alert management module may receive alerts generated by an event monitoring system and automatically process the alerts according to an alert ruleset. The alert management module may automatically create and configure issue tickets in an issue tracking system that correspond to the alerts received from the event monitoring system. In other words, the alert management system automatically converts or transforms discrete alerts received from an event monitoring system into issue tickets of an issue tracking system, which an IT support team may review to fix or maintain the computer system.

An event monitoring system refers to a computer system, computer device, or computer software application that monitors one or more computing resources of a computer system. Computing resources may be any computing device, hardware component, software application, or service provided by or operating at the computer system. The event monitoring system may generate alerts in response to the state, health, performance, activity, or operation of the computing resources. The alerts may be, for example, in the form of email messages transmitted to the email accounts of IT support team members. The alert ruleset refers to a collection of instructions that define how the alert management module processes the alerts received from the event monitoring system. The alert ruleset identifies one or more types of alerts that may be received from the event monitoring system and includes information respectively associated with the alert types that indicates, at least in part, how the alert management module processes alerts of those alert types. IT support team members may selectively configure the alert ruleset such that the IT support team is only notified of alerts deemed important, i.e., alerts the IT support team has an interest in.

Figure 1:
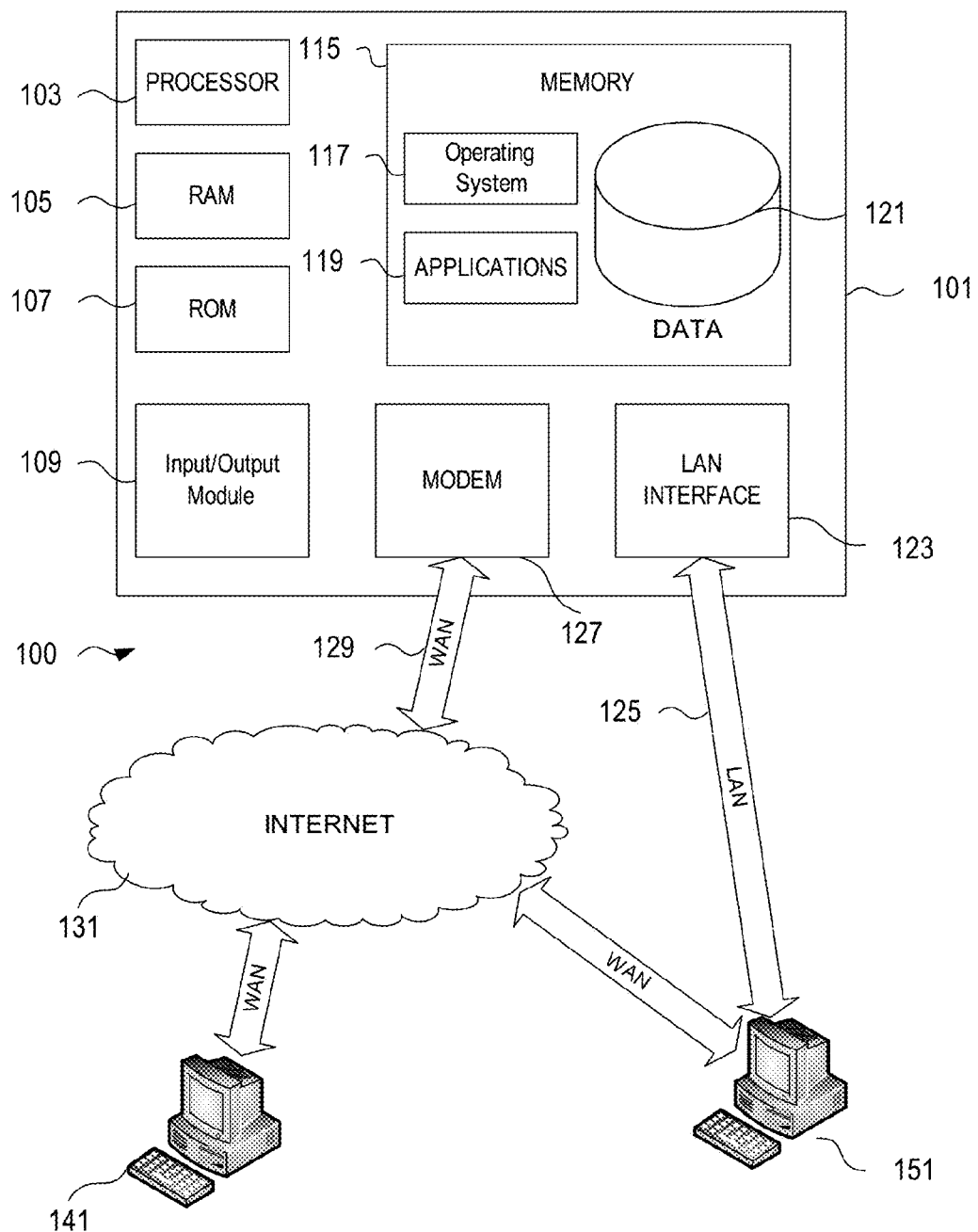
FIG. 1 shows an illustrative operating environment in which various aspects of the disclosure may be implemented.

FIG. 1 illustrates a block diagram of an example of an implementation of an alert management system 100. The alert management system 100 includes an alert management module 101, which is shown in this example as a computing device. The computing device 101 may have a processor 103 for controlling overall operation of the alert management module 101 and its associated components, including RAM 105, ROM 107, an input/output (I/O) module 109, and memory 115.

I/O module 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to the processor 103 for enabling the computing device 101 to perform various functions. For example, memory 115 may store software used by the computing device 101, such as an operating system 117, application programs 119, and an associated database 121. The processor 103 and its associated components may allow the computing device 101 to run a series of computer-readable instructions to process and manage the alerts generated by an event monitoring system.

The computing device 101 may operate in a networked environment supporting connections to one or more remote computers, such as terminals 141 and 151. The terminals 141 and 151 may be personal computers or servers that include many or all of the elements described above relative to the computing device 101. Alternatively, terminal 141 and/or 151 may be a data store that is affected by the operation of the alert management module 101. The network connections depicted in FIG. 1 include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the computing device 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the alert management module 101 according to an illustrative embodiment of the disclosure may include computer-executable instructions for invoking functionality related to processing and managing alerts generated by an event monitoring system.

The alert management module 101 and/or terminals 141 or 151 may also be mobile terminals, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
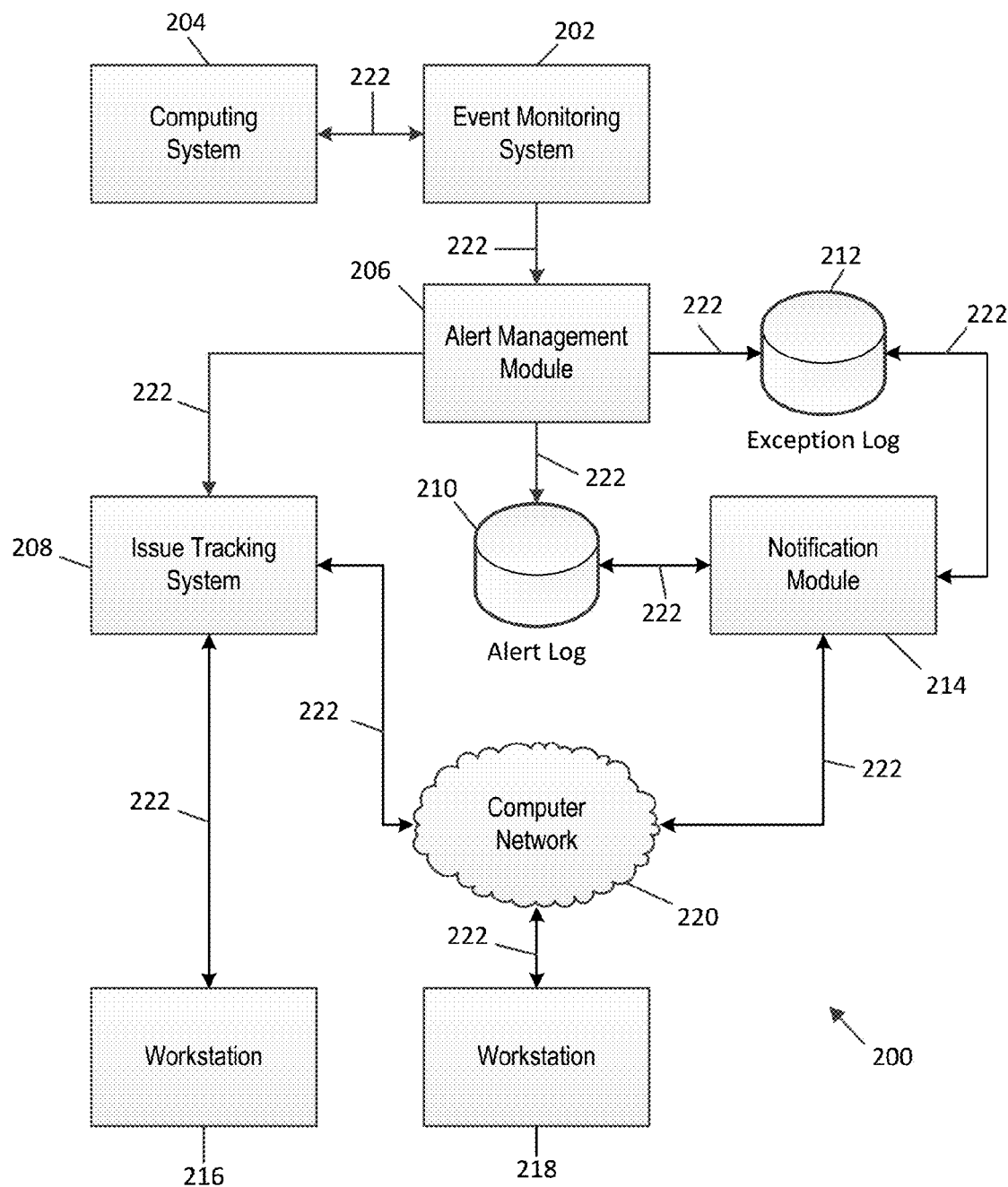
FIG. 2 is an illustrative block diagram of an alert management system that may be used to implement the processes and functions of one or more aspects of the present disclosure.

Referring to FIG. 2, an illustrative alert management system 200 for implementing methods according to the present disclosure is shown. As illustrated, the alert management system 200 includes an event monitoring system 202 that monitors one or more computing resources of a computer system 204 and an alert management module 206 in signal communication with the event monitoring system 202. The alert management module 206 is also in signal communication with an issue tracking system 208 that manages issue tickets for issues associated with the computing system 204. In response to receipt of alerts from the event monitoring system 202, the alert management module 206 may automatically create issue tickets corresponding to the alert in the issue tracking system 208.

The alert management module 206 may also be in signal communication with an alert log 210 and an exception log 212. The alert log 210 may include entries related to alerts received at the alert management module 206 from the event monitoring system 202, and the exception log 212 may include entries relating to exceptions generated by the alert management module 206. The alert log 210 and the exception log 212 may be implemented as a database where log entries are stored as records of one or more database tables, as a text file where log entries are stored as plain text, or in any other format suitable for logging alerts and exceptions.

A notification module 214 may be in signal communication with the alert log 210 and the exception log 212. When the alert management module 206 creates a new issue ticket for an alert, the alert management module 206 may also create a new entry in the alert log 210 that indicates a new issue ticket was created. The notification module 214 may read the alert log 210 and notify an IT support team member (e.g., via email) that a new issue ticket has been created. If the alert management module 206 generates an exception while processing an alert, then the alert management module 206 may create a new entry in the exception log 212 detailing the exception. The notification module 214 may read the exception log 212 and notify an IT support team member (e.g., via email) of the exception.

An IT support team member may access the issue tracking system 208 from a workstation 216 or 218 in signal communication with the issue tracking system 208. The workstation may be a workstation 216 that is local relative to the issue tracking system 208 or a workstation 218 that is remote relative to the issue tracking system 208. Accordingly, the remote workstation 218 may access the issue tracking system 208 via a computer network 220. The IT support team member may review the issue tickets of the issue tracking system 208 to subsequently address the issues at the computing system 204 that prompted the event monitoring system 202 to generate the alerts.

Conventionally, event monitoring systems 202 may provide alerts to IT support team members as emails. Accordingly, IT support team members may receive the alert emails at an email application running on a workstation 216 or 218 in signal communication with the event monitoring system 202. In this regard, the alert management module 206 may be implemented as an add-on, plug-in, or extension for the email client. The alert management module 206, in this example, may therefore intercept the alert emails received from the event monitoring system 202 and process the alert emails such that the IT support team member does not receive the alert email itself. Instead, the alert management module 206 may automatically processes the alert email to either discard the alert or create an issue ticket for the alert in an issue tracking system 208. The notification module 214 may notify an IT support team member (e.g., via email) when new issue tickets are created. In this way, an IT support team member may only receive an email when new issue tickets are created rather than for every alert generated by the event monitoring system 202.

In the alert management system 200, the event monitoring system 202, the alert management module 206, the notification module 214, and the issue tracking system 208 may each be any suitable server, processor, computer, data processing device, or combination thereof. Additionally, the components of FIG. 2 may be in signal communication with each other via one or more computer networks 220 using one or more communication links 222.

The computer network 220 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. The communications links 222 may be any communications links suitable for communicating between the components of FIG. 2 such as network links, dial-up links, wireless links, hard-wired links, and the like. The disclosure that follows may be implemented by one or more of the components in FIGS. 1 and 2 and/or other components, including other computing devices.

In some example implementations, the alert management module 206 may be configured to process alerts from a data center management system, as commercially available and known to a person having ordinary skill in the art. Additionally, the alert management module 206 may, in some examples, be configured to communicate with a commercially-available issue tracking system. It will be understood that the alert management module 206 may be configured to communicate with alternative event monitoring systems 202 as well as alternative issue tracking systems 208.

Figure 3:
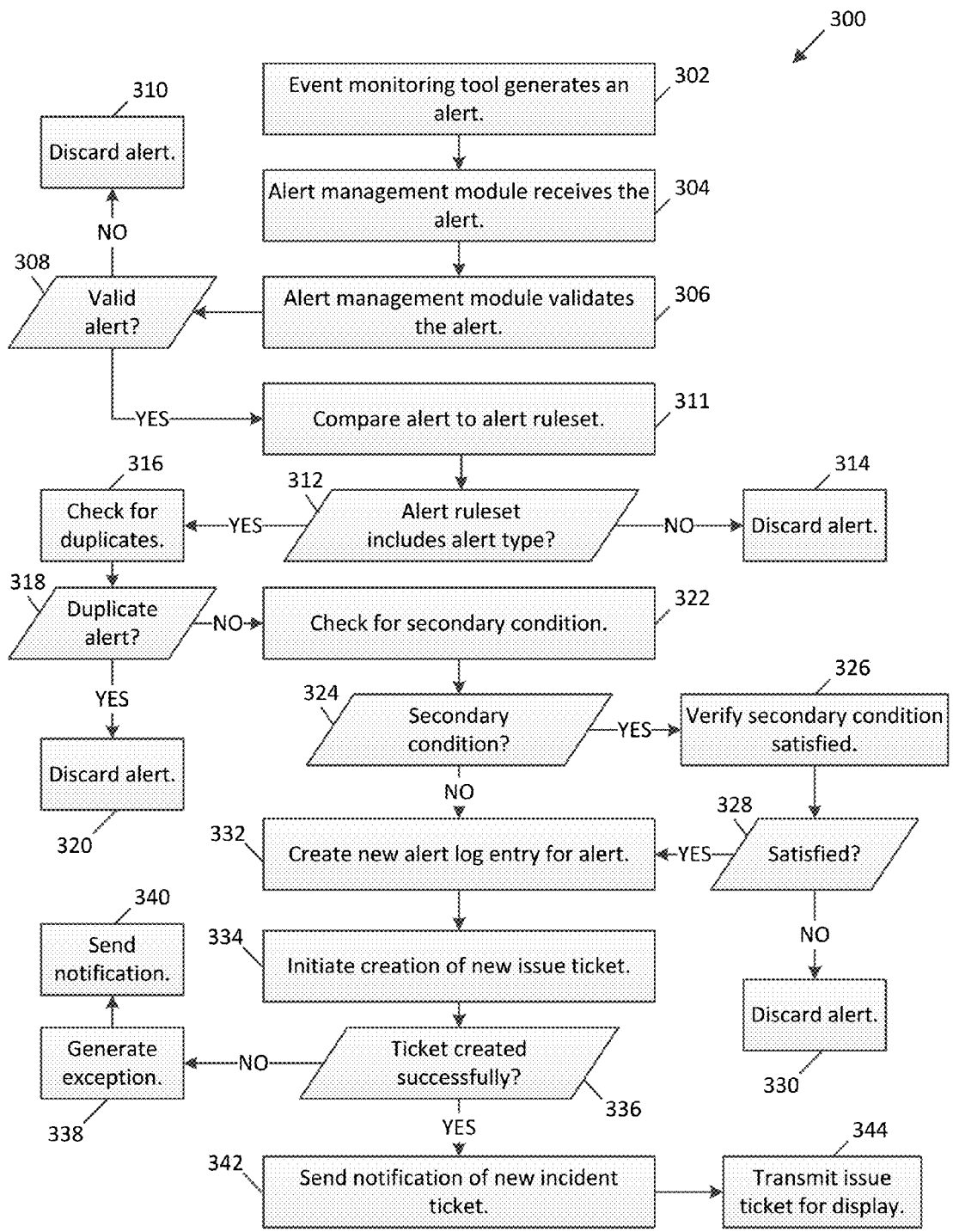
FIG. 3 is a flowchart of example method steps for automatically managing alerts generated by an event monitoring system.

Referring to FIG. 3, a flowchart 300 of example method steps for automatically processing alerts received from the event monitoring system is shown. As discussed above, an event monitoring system may be employed to monitor a computing system. The event monitoring system may generate an alert (step 302) in response to an issue with one of the computing resources of the computing system. The alert management module may receive the alert (step 304) from the event monitoring system.

In some example implementations, the IT support team may only have interest in alerts from particular computing resources of the computing system. For example, an IT support team may have interest in receiving notifications of alerts relating to an e-mail server but not those relating to a mobile phone secure enterprise server, or vice versa. Accordingly, the alert management module may validate the alert (step 306) to determine whether the alert relates to a particular computing resource of interest. In this regard, an alert may be a valid alert if the alert relates to a computing resource of interest, and an alert may not be a valid alert if the alert does not relate to a computing resource of interest. If the alert is not a valid alert (step 308), then the alert management module may discard the alert (step 310). If the alert is a valid alert (step 308), then the alert management module may continue processing the alert. It will be understood that the alert management module may be selectively configured to process alerts from one type of computing resource or multiple types of computing resources.

If the alert is a valid alert (step 308), then the alert management module may compare the alert to the alert ruleset (step 311). As discussed further below with reference to FIG. 4, the alert ruleset identifies one or more alert types and includes corresponding information that respectively indicates how the alert management module processes alerts of the identified alert types. If the alert ruleset does not include the alert type of the received alert (step 312), then the alert management module may discard the alert (step 314). If the alert ruleset includes the alert type of the received alert (step 312), then the alert management module may continue processing the alert.

In some situations, the event monitoring system may generate multiple alerts for the same issue. An IT support team may prefer to receive only one notification of the issue rather than multiple notifications for the same issue. Accordingly, in some example implementations, the alert management module may be configured to check if a received alert is a duplicate alert (step 316). The alert management module may be selectively configured to employ various approaches to identify a duplicate alert. For example, if a previous alert associated with the same computing resource was received within a predetermined time period prior to an alert, then the alert management module may determine that the alert is a duplicate alert. The predetermined time period may be, for example, around fifteen minutes prior to receipt of the alert. It will be understood that the alert management module may be selectively configured to employ additional or alternative criteria to determine whether an alert is a duplicate alert. If the alert management module determines that the alert is a duplicate alert (step 318), then the alert management module may discard the alert (step 320). If the alert management module determines that the alert is not a duplicate alert (step 318), then the alert management module may continue processing the alert.

In some, but not all, example implementations, the alert ruleset may specify a secondary condition for an alert type that must be satisfied for the alert management module to continue processing the alert. Secondary conditions will be discussed in further detail below with reference to FIG. 4. Not every alert type may be associated with a secondary condition however. Accordingly, the alert management module may check the alert ruleset to determine if the alert ruleset defines a secondary condition for the alert type of the alert (step 322). If the alert ruleset defines a secondary condition for the alert type (step 324), then the alert management module may determine if the secondary condition is satisfied (step 326). If the alert management module determines that the secondary condition is not satisfied (step 328), then the alert management module may discard the alert (step 330).

If the alert ruleset does not define a secondary condition for the alert type (step 324) or if the alert management module determines that the secondary condition is satisfied (step 328), then the alert management module may create a new entry in the alert log (step 332) and initiate creation of an issue ticket in the issue tracking system (step 334) for the alert. The alert management module may extract alert information from the alert, for example, the alert type, the computing resource associated with the alert, and timestamp information indicating when the alert management module received the alert. The alert management module may utilize this alert information when creating the entry in the alert log and when configuring the issue ticket in the issue tracking system. The alert management module may directly communicate with the issue tracking system such that the alert management module itself creates and configures the issue ticket. In an alternative implementation, the alert management module may initiate the creation of the issue ticket by transmitting one or more instructions to another module that directly communicates with the issue tracking system to create and configure the issue ticket. The alert management module may utilize an application programming interface (API) provided by the issue tracking system to create and configure the new issue ticket for the alert. It will be understood that the alert management module may be selectively configured to create and configure issue tickets in one or more types of issue tracking systems.

In some circumstances, the alert management module may be unable to create the issue ticket in the issue tracking system. For example, if the issue tracking system is offline or otherwise unavailable, then an IT support team member may need to be notified that an alert was received for which a ticket should have been generated, but was not generated. Accordingly, if the alert management module failed to successfully create an issue ticket in the issue tracking system (step 336), then the alert management module may generate an exception (step 338). In some example implementations, the alert management module may add new exception log entry to the exception log as discussed above with reference to FIG. 2. A notification module may read the exception log and send a notification to an IT support team member (step 340) in order to inform the IT support team member of the failure to create the new issue ticket for the alert. If the alert management module successfully created the issue ticket for the alert (step 336), then the notification module may send a notification to an IT support team member that a new issue ticket has been created (step 342). The notification module may read the alert log and send a notification to an IT support team member in order to inform the IT support team member of the new issue ticket. The notifications may be, for example, email messages. Having received notification of the new issue ticket, the IT support team member may utilize the issue tracking system to review the issue ticket and take appropriate action to address the issue that prompted the alert. The issue ticket may be transmitted via the issue tracking system to a display device for display to the user (step 344).

Referring now FIG. 4, an example of an implementation of an alert ruleset 400 is shown. As mentioned above, the alert ruleset 400 refers to a collection of instructions that define how the alert management module processes alerts received from the event monitoring system. In this regard, the alert ruleset 400 may be, for example, a configuration file, a properties file, or the like, and the alert ruleset may be stored at a memory of the alert management system such as memory 115 in FIG. 1.

The alert types 402 shown in the example alert ruleset 400 of FIG. 4 relate to alerts from an e-mail server. For example, the alert ruleset 400 of FIG. 4 lists alert types 402 relating to connection, availability, or disk space issues that may occur at an e-mail server. It will be understood that the alert ruleset 400 may include additional or alternative alert types 402 for additional or alternative types of computer system components.

The example alert ruleset 400 in FIG. 4 also includes information associated with the alert types 402 that indicates how the alert management module processes an alert of the alert type 402 listed. The associated information, in this example, includes a secondary condition 404 and a priority 406 associated with the alert type 402. It will be understood that the alert ruleset 400 may include additional or alternative information respectively associated with the included alert types 402.

The alert management module compares a received alert to the alert ruleset 400 in order to determine whether the alert ruleset 400 includes the alert type of the received alert. If the alert type of the received alert is not included in the alert ruleset 400, then the alert management module may discard the alert. If the alert type 402 is included in the alert ruleset as shown by way of example in FIG. 4, then the alert management module may continue processing the received alert. In this regard, whether the alert type 402 is included in the alert ruleset 400 may be understood as a primary condition that must be satisfied for the alert management module to continue processing the alert.

As noted above, the event monitoring system may provide alerts in the form of an email message, and the alert management module may be implemented as an add-on to an email client. Accordingly, the alert management module may determine whether the alert ruleset 400 includes the alert type 402 based on information contained in the alert email message such as, for example, the subject 408 of the alert email message. As shown by way of example in FIG. 4, the alert ruleset 400 is configured such that the alert ruleset 400 includes at least part of the subject line 408 of the corresponding alert email message received from the event monitoring system. Accordingly, the alert management module, in this example, may extract the subject from the alert email message and compare the subject to the alert ruleset 400. If the alert ruleset 400 includes the subject 408 extracted from the alert email message, then the alert management module may determine that the alert ruleset 400 includes the alert type 402 associated with the alert email message. In alternative implementations, the alert management module may compare keywords extracted from the subject of the alert email message to keywords listed in the alert ruleset 400 for the alert type 402. It will be understood that additional or alternative approaches may be selectively employed to determine whether the alert type for a received alert is included in the alert ruleset 400.

As also mentioned above, in one example an alert type 402 may also be associated with a secondary condition 404 that must also be satisfied for the alert management module to continue processing the alert. If the secondary condition 404 is not satisfied, then the alert management module may discard the alert. The secondary condition may relate to the alert itself, information contained in the alert, or other information associated with the alert. As shown by way of example in FIG. 4, the alert ruleset 400 includes an alert type 410 that indicates low disk space. In this example, the IT support team may only have interest in receiving notifications of low disk space on particular hard drives, e.g., the F: drive or the G: drive. Accordingly, the alert ruleset 400, in this example, includes a secondary condition 412 for the low disk space alert 410, which specifies that the alert management module should continue processing the alert if the low disk space alert indicates either the F: drive or the G: drive. If the alert indicates that a drive other than the F: drive or the G: drive has low disk space, then the alert management module may discard the alert as the secondary condition 412 in this example would not be satisfied. It will be understood that some of the alert types 402 identified in the alert ruleset 400 may not include a secondary condition 404.

The priority 406 associated with an alert type 402 listed in the alert ruleset 400 may indicate how to configure issue tickets created for alerts of the alert type 402. Priority 406 may be specified, for example, as high, medium, or low as shown by way of example in FIG. 4. The alert management module may thus configure the corresponding issue ticket in the issue tracking system based on the priority 406 indicated in the alert ruleset 400.

The alert ruleset 400 may be selectively configured according to preferences or needs of an IT support team. An IT support team member may, for example, include in the alert ruleset 400 only the alert types 402 the IT support team is interested in receiving notifications of. Moreover, an IT support team member may update the alert ruleset 400 as needed to add new alert types 402, remove alert types, edit secondary conditions 404, change priorities 406, and so on. In this way, the alert management system described provides IT support teams with the flexibility of conforming the alert ruleset 400 to their particular IT practices.

In some circumstances, the IT support team may wish to deactivate or disable the alert management module such that the alert management module does not notify the team of alerts generated by the event monitoring system. For example, during routine maintenance, computer systems may be taken offline, which may trigger various alerts. In these situations, the IT support team does not need to be notified of the alerts as the IT support team is already aware of the activity triggering the alerts. Accordingly, the alert management module may be configured to be selectively enabled and disabled as needed.

Figure 5:
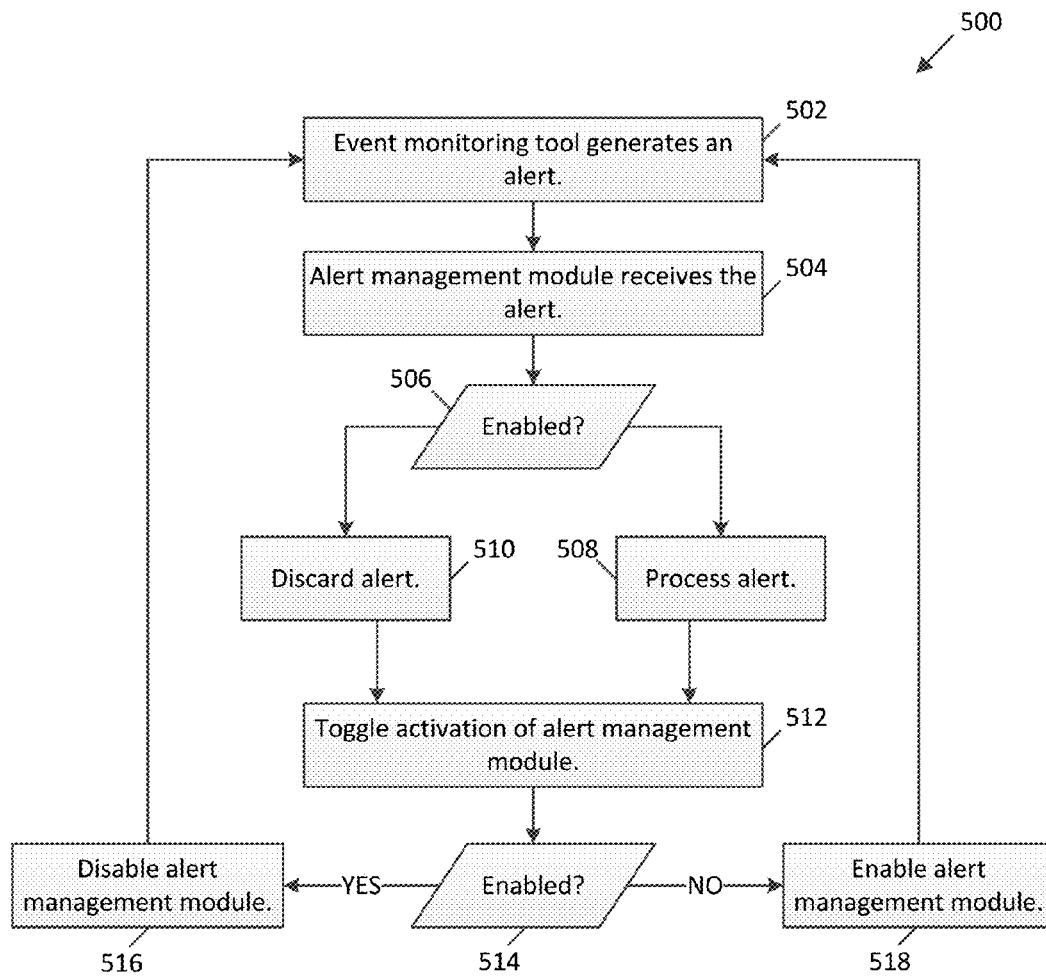
FIG. 5 is a flowchart of example method steps for toggling activation of the alert management module.

FIG. 5 is a flowchart 500 of example method steps for toggling activation of the alert management module. As seen in FIG. 5, the event monitoring system may generate an alert (step 502) that is received at the alert management module (step 504). If the alert management module is enabled (step 506), then the alert management module may process the alert (step 508) in accordance with the steps set forth above with reference to FIG. 3. If the alert management module is not enabled (step 506), i.e., if the alert management module is disabled, then the alert management module may discard the alert (step 510) such that the IT support team is not notified of the alert.

An IT support team member may selectively toggle activation of the alert management module as needed (step 512). If the alert management module is enabled (step 514), then toggling activation of the alert management module disables the alert management module (step 516). If the alert management module is not enabled (step 514), i.e., disabled, then toggling activation of the alert management module enables the alert management module (step 518).

Automatically processing alerts as described above advantageously reduces the manual effort currently devoted to review and act upon received alerts. Additionally, the duplicative efforts of IT support teams are advantageously minimized by automatically recognizing and discarding duplicate alerts as described above. Furthermore, because IT support team members may selectively configure the alert ruleset according to preference or need, the risk of missing important alerts is advantageously minimized. Automating the processing of alerts and the creation of corresponding issue tickets enables IT support teams to devote more time to fixing and maintaining the computer systems generating the alerts.

The present disclosures further provide technical advantages. As noted above, conventional event management tools that monitor enterprise-wide computing systems can potentially generate upwards of 70,000 alerts per month and upwards of 800,000 alerts per year. Accordingly, significant amounts of computer storage processing power may be necessary to store and process the alerts. Moreover, such a high volume of alerts can strain the capacity of email servers to provide alert emails to the IT support team. The alert management system provided mitigates these technical issues. In some circumstances, the alert management system provided has been shown to reduce the amount of alert notifications by a factor of a hundred. Such an improvement advantageously reduces the computer storage, processing power, and server capacity necessary to maintain an alert management system for enterprise-wide computing systems or, additionally or alternatively, permits the computing resources to be devoted to other tasks.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A computer-implemented method of managing alerts generated by an event monitoring system comprising:
   receiving, at a computing device from an event monitoring system, an alert associated with a computing resource monitored by the event monitoring system;
   applying, to the alert received, at least one rule of an alert ruleset stored in memory of the computing device; and
   either discarding the alert or providing a notification of the alert based on the at least one rule applied, wherein providing a notification of the alert comprises initiating creation and configuration of an issue ticket in an issue tracking system configured to manage issue tickets for issues associated with the computing resource, the issue ticket comprising at least a portion of information included in the alert;
   wherein the alert ruleset comprises a rule that identifies a primary condition and a secondary condition and is configured such that the notification is provided when both the primary condition and the secondary condition are satisfied and such that the alert is discarded when at least one of the primary condition or the secondary condition is not satisfied.

2. The computer-implemented method of claim 1, wherein:
   one of the primary condition or the secondary condition is satisfied when monitoring of the computing resource has not been disabled.

3. The computer-implemented method of claim 1, wherein:
   one of the primary condition or the secondary condition is satisfied when a first alert type specified by the rule matches a second alert type of the alert received.

4. The computer-implemented method of claim 3, wherein:
   the first and second alert type are related to one or more of:
      (i) connectivity associated with a computing resource,
      (ii) memory space associated with a computing resource,
      (iii) disk space associated with a computing resource, or
      (iv) availability of a computing resource.

5. The computer-implemented method of claim 1, wherein:
   one of the primary condition or the secondary condition is satisfied when a first computing resource type specified by the rule matches a second computing resource type identified by the alert.

6. The computer-implemented method of claim 1, wherein:
   one of the primary condition or the secondary condition is satisfied when a first computing resource specified by the rule matches a second computing resource identified by the alert.

7. The computer-implemented method of claim 1, further comprising:
   in response to determining that the issue ticket was not created successfully, providing a second notification indicating that the issue ticket was not created successfully.

8. The computer-implemented method of claim 7, wherein:
   providing the second notification comprises initiating creation of an entry in an exception log.

9. The computer-implemented method of claim 1, wherein:
   the alert received comprises an email; and
   receiving the alert comprises intercepting the email before the email is displayed at an inbox of an email client.

10. The computer-implemented method of claim 9, further comprising:
    preventing the email from being displayed at the inbox of the email client.

11. The computer-implemented method of claim 10, wherein:
    a set of computer-executable instructions installed at the email client as an extension of the email client intercepts the email, applies the at least one rule of the alert ruleset, and determines whether to discard the alert or provide the notification of the alert.

12. The computer-implemented method of claim 1, further comprising:
    if creation of an issue ticket was initiated in an issue tracking system, determining that the issue ticket was not successfully created in the issue tracking system, and updating an exception log to indicate the issue ticket was not successfully created.

13. A non-transitory computer-readable storage medium having computer-executable instructions stored thereon that, when executed by one or more processors of a computing device, cause the computing device to:
    receive, from an event monitoring system, an alert associated with a computing resource monitored by the event monitoring system;
    apply, to the alert received, at least one rule of an alert ruleset stored in memory of the computing device; and
    either discard the alert or provide a notification of the alert based on the at least one rule applied, wherein providing a notification of the alert comprises initiating creation and configuration of an issue ticket in an issue tracking system configured to manage issue tickets for issues associated with the computing resource, the issue ticket comprising at least a portion of information included in the alert;
    wherein the alert ruleset comprises a rule that identifies a primary condition and a secondary condition and is configured such that the notification is provided when both the primary condition and the secondary condition are satisfied and such that the alert is discarded when at least one of the primary condition or the secondary condition is not satisfied.

14. The non-transitory computer-readable storage medium of claim 13, wherein:
    the alert received comprises an email; and
    receiving the alert comprises intercepting the email before the email is displayed at an inbox of an email client.

15. The non-transitory computer-readable storage medium of claim 14, wherein:
    the computer-executable instructions, when executed by the one or more processors, further cause the computing device to prevent the email from being displayed at the inbox of the email client.

16. The non-transitory computer-readable storage medium of claim 15, wherein:
the computer-executable instructions are installed at the email client as an extension of the email client.

17. The non-transitory computer-readable storage medium of claim 13, wherein:
the computer-executable instructions, when executed by the one or more processors, further cause the computing device to, in response to determining that the issue ticket was not created successfully, provide a second notification indicating that the issue ticket was not created successfully.

18. The non-transitory computer-readable storage medium of claim 17, wherein:
providing the second notification comprises initiating creation of an entry in an exception log.

19. The non-transitory computer-readable storage medium of claim 13, wherein:
one of the primary condition or the secondary condition is satisfied when
(a) monitoring of the computing resource has not been disabled,
(b) a first alert type specified by the rule matches a second alert type of the alert received, wherein the first and second alert type are related to one or more of:
  (i) connectivity associated with a computing resource,
  (ii) memory space associated with a computing resource,
  (iii) disk space associated with a computing resource, or
  (iv) availability of a computing resource,
(c) a first computing resource type specified by the rule matches a second computing resource type identified by the alert, or
(d) a first computing resource specified by the rule matches a second computing resource identified by the alert.

20. The non-transitory computer-readable storage medium of claim 13, wherein:
the computer-executable instructions, when executed by the one or more processors, further cause the computing device to, in response to initiating creation of an issue ticket in an issue tracking system, determine that an issue ticket was not successfully created in the issue tracking system, and update an exception log to indicate the issue ticket was not successfully created.

* * * * *